United States Patent
Di Miro et al.

(10) Patent No.: US 9,707,964 B2
(45) Date of Patent: Jul. 18, 2017

(54) METHOD AND DEVICE FOR RECOGNIZING A WATER PASSAGE BY MEANS OF DISTANCE SENSORS

(71) Applicant: Robert Bosch GmbH, Stuttgart (DE)

(72) Inventors: Ariel Di Miro, Stuttgart (DE); Andy Tiefenbach, Vaihingen-Horrheim (DE); Markus Becker, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/032,459

(22) PCT Filed: Oct. 28, 2014

(86) PCT No.: PCT/EP2014/073084
§ 371 (c)(1),
(2) Date: Apr. 27, 2016

(87) PCT Pub. No.: WO2015/063066
PCT Pub. Date: May 7, 2015

(65) Prior Publication Data
US 2016/0264142 A1 Sep. 15, 2016

(30) Foreign Application Priority Data
Oct. 30, 2013 (DE) .................. 10 2013 222 022

(51) Int. Cl.
*B60W 30/18* (2012.01)
*B60W 50/00* (2006.01)

(52) U.S. Cl.
CPC .. *B60W 30/18009* (2013.01); *B60W 50/0097* (2013.01); *B60W 2420/00* (2013.01);
(Continued)

(58) Field of Classification Search
CPC ....... B60W 30/18009; B60W 50/0097; B60W 2420/00; B60W 2550/10; B60W 2550/12;
(Continued)

(56) References Cited

U.S. PATENT DOCUMENTS

| | | | |
|---|---|---|---|
| 2011/0214989 A1* | 9/2011 | Opp | G01N 27/4073 204/424 |
| 2013/0131958 A1* | 5/2013 | Weber | F02D 41/064 701/102 |
| 2013/0336090 A1* | 12/2013 | Tran | B60G 17/0165 367/13 |

FOREIGN PATENT DOCUMENTS

| | | |
|---|---|---|
| DE | 10133384 | 1/2003 |
| WO | 2012080439 | 6/2012 |

(Continued)

OTHER PUBLICATIONS

International Search Report for Application No. PCT/EP2014/073084 dated Feb. 12, 2015 (English Translation, 2 pages).

*Primary Examiner* — Rodney Butler
(74) *Attorney, Agent, or Firm* — Michael Best & Friedrich LLP

(57) ABSTRACT

The invention relates to a method and to a device, in particular a control and evaluation unit, for recognizing a water passage or a high water level for a vehicle, which has, as a drive, an internal combustion engine having an exhaust train, in which the functionality of an emission control system is monitored or controlled by at least one exhaust sensor and the exhaust sensor is operated at least intermittently at high temperatures and has thermal shock susceptibility by design. According to the invention, a water recognition criterion is determined based on one or a plurality of distance sensors and, at critical values of the water level which are predicted or have already been reached, protective measures are initiated for the emissions control (Continued)

system of the vehicle or for the exhaust sensor or exhaust sensors arranged in the exhaust duct. Damage to exhaust sensors or to components of the emissions control system as a result of the severe cooling upon contact with water can thus be minimized. In addition, misinformation of the exhaust sensors due to a thermal shock and a possible accompanying malfunction can also be recognized by said anticipatory protective measures and correspondingly suppressed.

11 Claims, 1 Drawing Sheet

(52) U.S. Cl.
CPC ..... *B60W 2420/52* (2013.01); *B60W 2420/54* (2013.01); *B60W 2550/10* (2013.01); *B60W 2550/12* (2013.01); *F01N 2260/10* (2013.01); *F01N 2560/028* (2013.01); *Y02T 10/84* (2013.01)

(58) Field of Classification Search
CPC . B60W 2420/52; B60W 220/54; Y02T 10/84; F01N 2560/028; F01N 2260/10
See application file for complete search history.

(56) References Cited

FOREIGN PATENT DOCUMENTS

| WO | 2012080440 | 6/2012 |
| WO | 2012123555 | 9/2012 |
| WO | 2013135717 | 9/2013 |

* cited by examiner

METHOD AND DEVICE FOR RECOGNIZING A WATER PASSAGE BY MEANS OF DISTANCE SENSORS

BACKGROUND OF THE INVENTION

The invention relates to a method for recognizing a water passage or a high water level for a vehicle, which has, as a drive, an internal combustion engine having an exhaust train, in which the functionality of an emission control system is monitored or controlled by at least one exhaust sensor and the exhaust sensor is operated at least intermittently at high temperatures and has thermal shock susceptibility by design.

The invention further relates to a device, in particular a control and evaluation unit for carrying out the method according to the invention.

According to the prior art, exhaust sensors, such as, e.g., lambda probes, particle sensors or nitrogen oxide sensors, are based on ceramic sensor elements which are heated at least intermittently during operation.

Particle sensors (PM) are used, for example, today to monitor the carbon-particulate emissions of internal combustion engines or for the on-board diagnostics (OBD), for example for the functional monitoring of particle filters, e.g. a diesel particle filter (DPF). Such a resistive particle sensor is described in the German patent specification DE 101 33 384 A1. The particle sensor is constructed from two interlocking, comb-shaped electrodes which are at least partially covered by a catch sleeve. If particles from a gas stream are deposited on the particle sensor, this then leads to an analyzable change in the impedance of the particle sensor, from which an inference can be made about the amount of accumulated particles and thus about the amount of the particles being carried in the exhaust gas.

If the particle sensor is fully loaded, the accumulated particles are burned in a regeneration phase with the aid of a heating element in the particle sensor. To this end, the ceramic of the sensor element is heated to high temperatures, typically to >600° C. In this regeneration phase, the sensor element reacts sensitively to large local changes in temperature or, respectively, to a thermal shock, as said shock can arise from the impact of water or water drops. Such a thermal shock can lead to cracks in the sensor element. A sensor regeneration is then only requested by the engine control device if, according to a heat quantity calculation in the engine control device, water can no longer be present at the sensor installation position.

In addition, it is essential to prevent that the particle sensor is subjected to water when the temperature of the sensor element of such exhaust sensors is greater than a specified threshold temperature, typically approximately 200° C. For this reason, the operation takes place when heating the exhaust sensors at a temperature >200° C., in particular after a cold start as long as condensation can still be present in the exhaust train of the internal combustion engine, first after a certain amount of time, in which it can be assumed that all of the water has either evaporated or has been removed in the form of droplets from the exhaust train by means of gas discharges during a driving operation. This point in time is typically denoted as the dew point end (DPE) and depends on many conditions. That is why this point in time has to be determined for each vehicle type in accordance with the application. The operation of the exhaust gas sensors at temperatures >200° C. is allowed as long as there is no condensation of water in the exhaust train in the region of the sensor installation point as a result of cooling.

By severely subjecting the exhaust system to water from the outside, e.g. when traversing water or when putting a boat into water on a slip ramp, water can penetrate into the exhaust system, whereby the exhaust system can be severely cooled down. Depending on the configuration of the exhaust system, this cooling down of said system cannot be recognized by the engine control device but can present a risk of thermal shock at a sensor element of the exhaust sensors. This case is not covered to this point when dating the dew point end because the exhaust sensors up to now typically are primarily installed in the exhaust train of the internal combustion engine so as to be in close proximity to the engine. Hence, it is unlikely that water would come in contact with the exhaust gas sensor when traversing water. By using new exhaust sensors, such as particularly particle or nitrogen oxide sensors, which, in a system-dependent way, are located far to the back of the exhaust train, it is necessary to expand the functionality of the dew point end-determination. To this end, a water passage has to recognized, which up until now has not been the case.

It is furthermore important to recognize a water passage early on in order to have time to take suitable measures to protect the sensor. The sensor elements to be protected can be operated at temperatures to over 800° C. so that a cooling of said sensor elements under 300° C. can take several seconds to minutes.

In the WIPO patent application WO 2012/080439 A1, a system is described for indicating water passages of a vehicle, said system comprising an emitter/receiver sensor having an oscillating membrane and a control unit, wherein the sensor is designed as an ultrasonic sensor. A method for recognizing water by means of this sensor is furthermore described. This sensor can additionally be used as a distance sensor or parking sensor. The system can furthermore comprise a sensor for determining the depth of the water. The initiation of protective measures for protecting the emission control system or, respectively, the exhaust sensors installed therein upon reaching critical water levels is however not disclosed.

It is therefore the aim of the invention to see in advance a water crossing, respectively a water passage, which is associated with an abrupt cooling of the exhaust train by means of surrounding water, in particular downstream of a particle filter, and thereupon to be able to take anticipatory measures in order to protect the ceramic based exhaust sensors, which were mentioned above, in this region from a thermal shock.

It is furthermore the aim of the invention to provide a corresponding device for carrying out the method, in particular a control and evaluation unit.

SUMMARY OF THE INVENTION

The aim relating to the method is met by virtue of the fact that a water recognition criterion is determined on the basis of one or a plurality of exhaust sensors and, at critical values of the water level which are predicted or have already been reached, protective measures are initiated for the emission control system of the vehicle or for the exhaust sensor or exhaust sensors arranged in the exhaust duct. Damage to exhaust sensors or to components of the emission control system, which typically have high operating temperatures (>300° C.), as a result of the severe cooling upon contact with water can thus be minimized because a supposedly longer contact with water can be predicted in a timely manner using the method. In addition, misinformation of the exhaust sensors due to a thermal shock and a possible accompanying malfunction can also be recognized early on and correspondingly suppressed. The method can furthermore distinguish between a cooling due to cold exhaust discharges and one due to contact with water.

In a preferred variant to the method, water levels which can take on critical values are proactively detected using distance sensors, which are arranged in the forward region of the vehicle and are substantially oriented forwards in the direction of travel of the vehicle. In so doing, it is particularly advantageous that a water passage can be recognized very early on and therefore more time remains for system measures, said time particularly allowing for the cooling down of the sensor elements of the exhaust sensors to non-critical temperatures, typically to temperatures <300° C. because thermal processes elapse more slowly.

In a further preferred variant to the method, provision can be made for water levels, which can take on critical values, to be determined using distance sensors which are arranged in the rear region of the vehicle and are oriented downwards or to the rear. Hence, the water level can, for example, be detected and corresponding protective measures can be initiated for the exhaust sensors and/or other sensitive components in the exhaust tract of the internal combustion engine, e.g. a particle filter or catalytic converter, when backing the vehicle up, e.g. during a procedure on a slip ramp, i.e. when putting a boat trailer into the water on a boat unloading ramp. In addition, the driver can be made aware of how steep the ramp is, respectively what depth of water is to be expected. The exhaust sensor or exhaust sensors is/are preferably installed in the proximity of the relevant exhaust sensors or components of the emission control system.

With regard to a low and therefore cost effective applicative effort, it is advantageous if distance sensors and/or evaluation devices are used which otherwise are used for a distance warning system and/or a parking assistance system in the vehicle.

With regard to the reliability and costs thereof, it has proven to be advantageous if typical distance sensors are used, which operate on the basis of ultrasound or radar. These sensors are already installed in large quantities in current parking assistance systems and distance warning systems and are correspondingly robust and inexpensive.

Provision is made in a preferred variant of the method for the sensor heater of the exhaust sensor to be switched off or down-regulated as a protective measure or for measures taken within the engine to be initiated in order to reduce the temperature in the exhaust tract of the internal combustion engine. Hence, a rapid cooling to non-critical temperature values can be achieved.

The method according to the invention, as said method was previously described in variants thereof, provides particular advantages for exhaust sensors, such as lambda probes, particle sensors and/or nitrogen oxide sensors. Said exhaust sensors generally have a ceramic base body, to which or in which corresponding sensor structures are applied or integrated. Said sensors also include, e.g., sensors with which a hydrocarbon concentration can be measured in the exhaust. In addition, said sensors are operated continually or at least intermittently, e.g. when regenerating a particle sensor, at high temperatures, i.e. >200° C., typically at 600 to 800°, and therefore have a thermal shock susceptibility which, during a rapid cool-down, can lead to the destruction and/or malfunction of said sensors as a result of massive contact with water.

The aim relating to the device is met by virtue of the fact that a water recognition criterion can be determined on the basis of one or a plurality of distance sensors by means of a control and evaluation device and that protective measures for the emission control system of the vehicle or for the exhaust sensor or exhaust sensors arranged in the exhaust duct can be initiated at critical values of the water level which are predicted or have already been achieved, wherein the functionality of the water recognition is implemented in a control and evaluation unit of the distance sensors for a parking assistance system present in the vehicle and/or a distance warning system. These control and evaluation units are typically present in present-day vehicles as standard equipment or for an additional cost, so that only a small applicative effort is required to initiate corresponding protective measures, as previously described, in accordance with the evaluation results. The functionality can be implemented by means of a software upgrade. In addition, the driver can be informed in an anticipatory manner with regard to expected critical water levels or when backing up, for example on a boat unloading ramp. Current water level height can be relayed to the driver by means of displays or warning lights in the cockpit.

BRIEF DESCRIPTION OF THE DRAWINGS

The invention is explained in greater detail below using an exemplary embodiment depicted in the figures of the drawings. In the drawings.

DETAILED DESCRIPTION

The method according to the invention utilizes present sensors and evaluation devices. Present sensors relate thereby to sensors on the basis of ultrasound and/or radar sensors. A description of an ultrasound-based system is presented below, wherein the method can in principle also be applied to radar-based systems because the function of the distance measurement is similar.

Ultrasound-based measuring systems in the vehicle are used in order to measure a distance to an object located in front of a sensor. As a rule, the sensors employed are based on the pulse-echo method. In this operation, the sensor transmits an ultrasonic pulse and measures the reflection of the ultrasonic pulse (echo) induced by an object. The distance between sensor and object is calculated by means of the measured echo transmission time and the sound speed. A reflection of the ultrasonic pulse is caused by so-called sonically hard materials, such as, e.g., metal. The transition from air to water is also to be classified as sonically hard.

Figure 1:
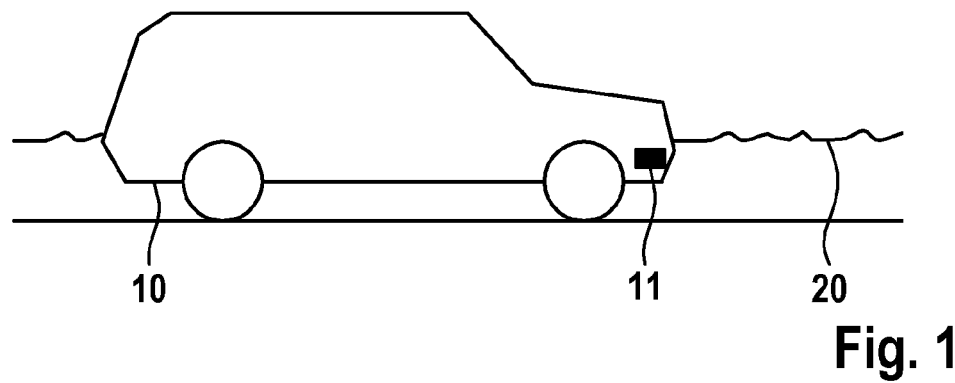
FIG. 1 shows a vehicle during a water passage at a high water level in a schematic depiction.
Figure 2:
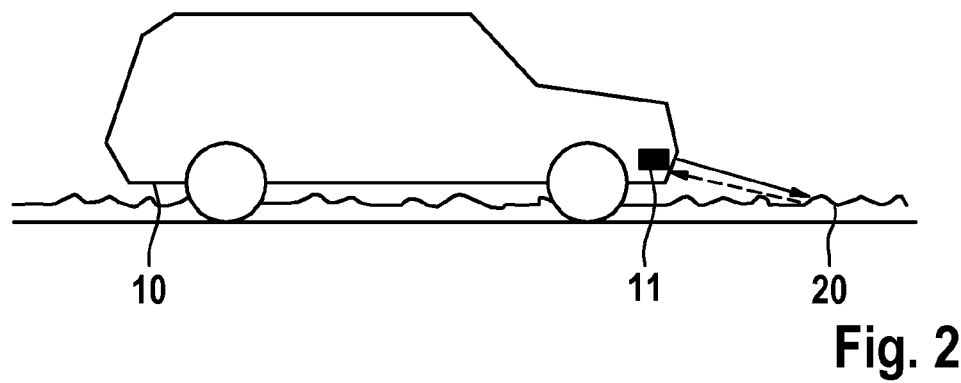
FIG. 2 shows the vehicle comprising a distance sensor oriented forwards during a water passage at a low water level.
Figure 3:
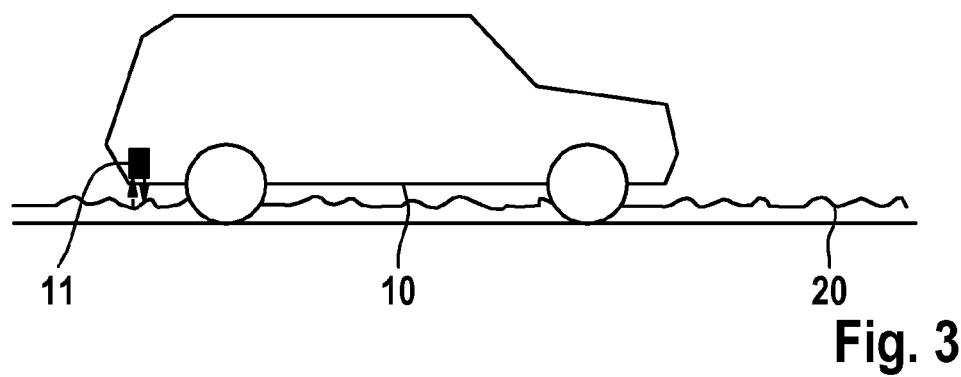
FIG. 3 shows the vehicle comprising a distance sensor oriented downwards during a water passage at a low water level.

FIGS. 1 to 3 each show a vehicle 10 during a water passage or water crossing in a schematic depiction.

FIG. 1 shows a situation in which the distance sensors 11 present in the vehicle 10, e.g. designed as parking assistance systems, are by way of example oriented horizontally forwards. An unambiguous reflection occurs in this configuration primarily when the distance sensors 1 are completely deluged with water, as this condition occurs at a comparatively high water level 20. Other orientations of the distance sensors 11 can also be rearwards or to the side, wherein an installation in the bumpers is particularly advantageous.

In FIG. 2, a situation is depicted in which the vehicle 10 is shown during a water passage at a low water level 20. If it is assumed that the water surface has a certain waviness, reflections are then to be expected in the case of the distance sensor 11 that is oriented forwards if the water surface lies at a low level, wherein weaker echoes are however to be expected.

It is particularly advantageous if the distance sensor is mounted and oriented in a downward direction, as this is shown in FIG. 3. In this configuration, the distance to the water can be measured under any conditions using the distance sensors 11 and therefore the water level 20 can be determined or, respectively, the water depth can be ascertained. Said distance sensor is preferably in the proximity of the relevant exhaust sensors, i.e. in the rear vehicle region, e.g. below the rear bumper. Thus, a reliable and timely recognition can also take place if the vehicle 10 only partially travels into water, i.e. on a boat unloading ramp.

The functionality of the water recognition can be implemented here as a software module in a control or evaluation unit of the distance sensor 11, e.g. in the parking assistance system or distance warning system, wherein corresponding signals are transmitted to an engine control system of the internal combustion engine if a water passage or, respectively, a high water level is detected in order to be able to initiate corresponding protective measures for the components installed in the exhaust tract of the internal combustion engine, in particular for the exhaust sensors operated at higher temperatures.

The invention claimed is:

1. A device for recognizing a water passage or a high water level for a vehicle having an internal combustion engine and an exhaust system, the device comprising:
   at least one exhaust sensor monitoring functionality of an emission control system, and having thermal shock susceptibility;
   at least one distance sensor; and
   a control and evaluation unit electrically connected to the at least one distance sensor and configured to
      determine a water recognition criterion based on data from the at least one distance sensor, and
      when the water recognition criterion indicates critical values of the water level which are predicted or have already been reached, initiate anticipatory measures for protecting the at least one exhaust sensor from thermal shock.

2. A method for recognizing a water passage or a high water level for a vehicle, the method comprising:
   monitoring functionality of an emission control system via at least one exhaust sensor having thermal shock susceptibility;
   operating the at least one exhaust sensor;
   determining, based on data from one or a plurality of distance sensors, a water recognition criterion;
   determining, based on the water recognition criterion, that critical values of the water level which are predicted or have already been reached and
   initiating anticipatory measures for protecting an exhaust sensor of an emission control system from thermal shock.

3. The method according to claim 2, wherein water levels which can take on critical values are detected by the one or the plurality of distance sensors, which are arranged in the front region of the vehicle and are oriented substantially forwards in the direction of travel of the vehicle.

4. The method according to claim 2, wherein water levels which take on critical values are determined by the distance sensors, which are arranged in the rear region of the vehicle and are oriented downwards or rearwards opposite to the direction of travel of the vehicle.

5. The method according to claim 2, wherein distance sensors and/or evaluation devices are used which are otherwise used for a distance warning system and/or a parking assistance system in the vehicle.

6. The method according to claim 2, wherein distance sensors are used which operate on the basis of ultrasound or radar.

7. The method according to claim 2, wherein initiating the anticipatory measures includes switching off or down-regulating.

8. The method according to claim 2, wherein lambda probes, particle sensors, nitrogen oxide sensors and/or other exhaust sensors based on a ceramic sensor element are used as exhaust sensors.

9. The method according to claim 2, wherein, in an anticipatory manner with regard to expected critical water levels or when backing up, the driver is additionally informed about the current height of the water level by means of displays or warning lights in the cockpit.

10. The method according to claim 2, wherein initiating the anticipatory measures includes reducing a temperature in an exhaust tract of the vehicle.

11. The method according to claim 2, wherein the water level is at a critical value when the one or the plurality of distance sensors measures an unambiguous reflection and the water level is not at a critical value when the one or the plurality of distance sensors measures a weak reflection.

* * * * *